March 6, 1951  L. M. DYSON ET AL  2,544,590
BICYCLE LOCK
Filed July 5, 1947
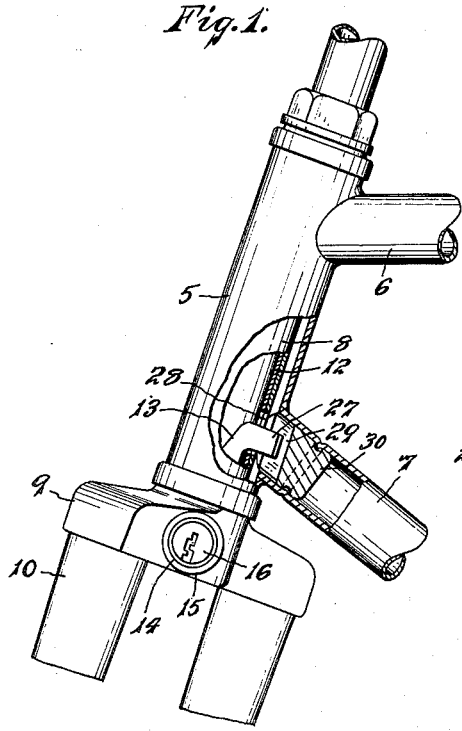
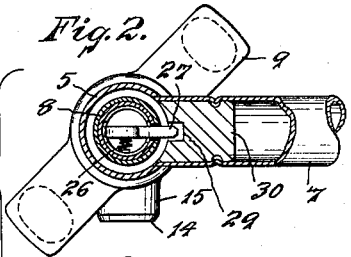
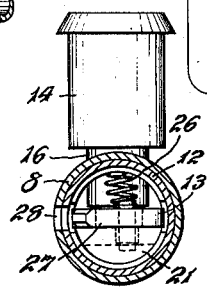
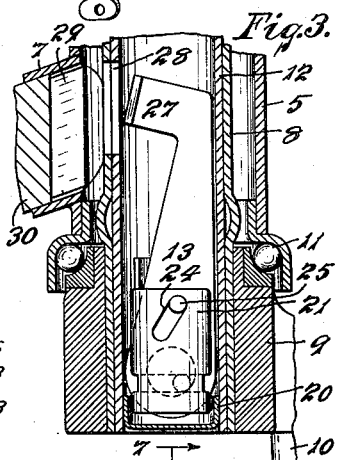
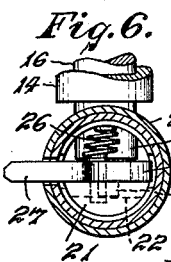
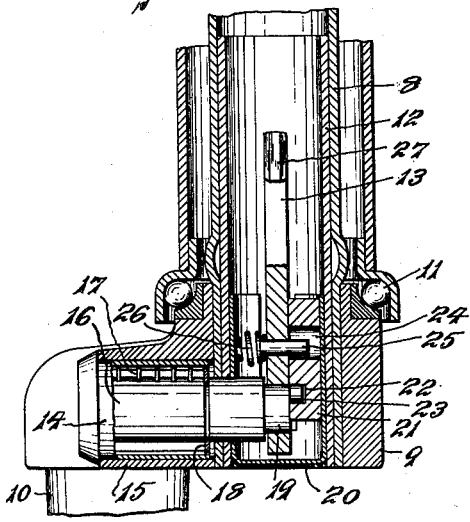
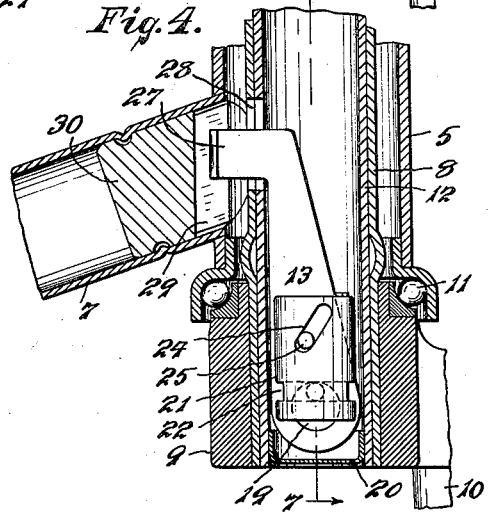
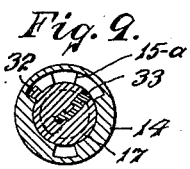
INVENTOR.
LOUIS M. DYSON.
BY JOHN G. ROOT.
Louis V. Lucia
ATTORNEY.

Patented Mar. 6, 1951

2,544,590

UNITED STATES PATENT OFFICE 2,544,590

BICYCLE LOCK

Louis M. Dyson and John G. Root, New Britain, Conn., assignors to The American Hardware Corporation, New Britain, Conn.

Application July 5, 1947, Serial No. 759,288

7 Claims. (Cl. 70—233)

This invention relates to a bicycle lock and more generally to locking means especially adapted for vehicles such as bicycles and the like.

An object of the invention is to provide a lock mechanism for locking the fork of a bicycle, or the like, in such a manner that it cannot be moved relatively to the frame of the bicycle for steering.

A further object of the invention is to provide such a lock for locking the front wheel of a vehicle at an angle to the frame thereof, so as to prevent riding of the vehicle and to make it very difficult for it to be carried away on its own wheels while it is in locked condition.

A further object of the invention is to provide such a lock which is inexpensive to produce, extremely simple to install and which will not weaken the normal construction of the vehicle.

A still further object of the invention is to provide a lock which is readily accessible from the side of the vehicle frame for the locking and unlocking operations.

Further objects and advantages of this invention will be more clearly understood from the following description and from the accompanying drawings, in which—

Fig. 1 is an elevational side view, partly broken away in central vertical section, showing the fork of a bicycle or the like in locked position.

Fig. 2 is a sectional plan view thereof partly in section.

Fig. 3 is an enlarged view, in central vertical section, from the opposite side of that shown in Fig. 1 and showing the lock in open position.

Fig. 4 is a similar view showing the said lock in locking position.

Fig. 5 is a plan view of the lock cylinder and the fork stem in the position illustrated in Fig. 3.

Fig. 6 is a similar view showing the mechanism in the position illustrated in Fig. 4.

Fig. 7 is a rear view in vertical section on line 7—7 of Fig. 4.

Fig. 8 is a sectional view of the cylinder lock showing the plug in the locked position.

Fig. 9 is a similar view showing the plug in the unlocked position.

As illustrated in the drawings, our invention may be embodied in a bicycle structure, or the like, comprising the conventional tubular frame having a tubular head 5 to which are permanently secured the upper bar 6 and the lower bar 7 of the frame.

The hollow stem 8, which extends upwardly from the crown portion 9 of the fork 10, is rotatably mounted within the tubular head 5, by means of suitable frictionless bearings 11, to permit steering of the vehicle by the usual handle bars, not shown.

Our improved locking means comprises a locking mechanism which is preferably mounted within the crown 9 and projects into the stem 8 as illustrated. This mechanism may include a tubular reinforcing member 12 which is slidably insertable within the stem 8 and contains therein the locking latch or bolt 13 that is adapted to lock the stem 8 to the frame.

A lock cylinder 14 is mounted within a projection 15 on the crown 9 which has an opening therein to receive the said cylinder. A lock plug 16, of suitable conventional construction, is rotatably mounted within the cylinder and has the usual key operated tumblers 17 which co-operate with lengthwise grooves in the cylinder 14 to lock or unlock the said plug for rotational movement within said cylinder. The said plug is also provided with a suitable retainer in the form of a washer 18 for retaining it in position within the cylinder.

The end of the plug 16 projects into the stem 8, as clearly illustrated in Fig. 7, and has a reduced bearing portion 19 which pivotally carries the locking latch 13 and is disposed within a cup-shaped member 20 having a hole therein through which the plug extends and which is adapted to close the opening at the bottom of the stem 8 for shielding the lock mechanism therein to prevent access thereto and protect it from dirt. The said cup-shaped member 20 has opposed slots in the walls thereof to receive the opposite edges of the latch 13 and permit pivotal movement of said latch upon the bearing portion 19.

The lock mechanism includes a slide 21 having a groove 22 to receive an operating crank stud 23, on the end of the plug 16, and a cam slot 24 which receives a latch operating pin 25 that projects into said groove from the side of the latch 13, a compression spring 26 being employed at the opposite side of said latch for urging it towards and into contact with the side of the slide 21, the said spring being retained in position by fitting over the projecting end of the pin 25, as illustrated.

The latch 13 is provided with a projection 27 that is adapted to extend through a slot 28 in the stem 8 and into a locking notch 29 that is preferably provided in a plug 30 which is inserted within the bar 7 adjacent to the inner wall of the head 5 and which may be permanently secured to the said bar in any suitable manner.

The above described construction for our improved lock permits ease in assembling it to the vehicle, it being only required that the plug 30 be secured to the bar 7 before the said bar is permanently connected to the head 5. The said lock mechanism may then be assembled by first mounting the slide 21, the latch 13 and the spring 26 within the cup member 20 and forming a unit thereof, then inserting said unit into the opening in the stem 8, from the bottom thereof, and then inserting the locking unit, comprising the cylinder 14 and plug 16, through the opening 17 in the side of the crown 9 to project the bearing portion 19 into the central opening of the latch 13 and the crank stud 23 into the groove 22 of the slide 21. The lock cylinder unit may then be secured within the head 9 by any suitable means, not shown, such as a pin or screw which may project into said head from either the top or bottom thereof.

As shown in Figs. 5 and 6, it will be noted that the compression spring 26 will act to urge and retain the latch 13 against the side of the slide 21 and also to urge said latch into locked and unlocked positions, the spring acting as a toggle fulcrumed against the inner side of the cup-shaped member 20 with its other end adapted to tip to opposite sides of its central axis as the latch is moved accordingly so as to urge the bolt into locked and unlocked positions and retain it in such positions against accidental displacement such as might be caused by vibration.

As illustrated in Figs. 8 and 9, the cylinder and plug lock unit construction may include a suitable groove 31 in the cylinder 14 which receives a projection 32 on the plug 16 to limit the rotational movement of said plug relatively to the cylinder and to prevent withdrawal of the key, indicated at 33, except when the lock is in locking position, it being understood that, when the lock is in the position shown in Fig. 8, the tumblers 17 project into the groove 15—a and lock the plug against rotational movement. When the key is inserted into the lock, the said tumblers will be withdrawn into the plug which may then be rotated into the position shown in Fig. 9, wherein the tumblers will be prevented from moving outwardly from the plug and thereby retaining the key within the lock so that it cannot be withdrawn therefrom until the lock is again brought into locked position.

The operation of our improved lock is as follows:

When it is desired to lock a bicycle, or the like, the fork 10 thereof is rotated into the position illustrated in Fig. 2 in which position the latch 13 will be in alignment with the notch 29 in the retainer plug 30. The key is then operated to rotate the plug 16 into the position illustrated in Fig. 9 wherein the tumblers 17 will align with the groove 15—a. Such rotation of the plug 16 will cause the crank stud 23 to move the slide 21 upwardly so that the cam slot 24 will, through the pin 25, rock the latch 13 outwardly and cause the projection 27 thereon to extend through the openings 28 in the stem and into the notch 29, thus locking the said fork against rotation in the tubular head 5. The key 33 may then be withdrawn from the lock and the tumblers 17 will remain within the groove 15—a and retain the lock in locking position.

When it is desired to unlock the bicycle, the key is inserted into the plug 16 and the said plug is then rotated into the position shown in Fig. 9, whereby the slide 21 will be moved downwardly and the cam slot 24 will cause the latch to be rocked into the unlocked position shown in Fig. 3.

From the above description it will be clearly understood that our invention provides a lock which is highly efficient in its operation, as well as simple in construction and therefore inexpensive to produce. It will also be noted that, as shown in Fig. 3, when the fork 10 is placed in position for locking, the lock is brought into a position wherein it may be conveniently reached from the side of the vehicle frame for operation thereof with the key 33.

We claim:

1. For a bicycle frame having a fixed tubular head and a wheel fork including a crown portion with a hollow stem projecting therefrom and rotatable in said head, a lock comprising a cylinder mounted in said head, a key operated plug rotatable in said cylinder and extending into the said stem, a latch in said stem rotatably carried by said plug and having a projection thereon adapted to extend through an opening in the wall of said stem to engage retaining means for preventing rotation of the stem when said latch is in locking position, a slide member having a cam slot and a crank receiving groove therein, a pin projecting from said latch into said slot, and a crank stud projecting from the end of said plug into said groove for moving said slide member within said stem by key controlled rotation of said plug to operate said latch into locking and unlocking positions.

2. For a bicycle frame having a fixed tubular head and a wheel fork including a crown portion with a hollow stem projecting therefrom and rotatably mounted within said head, a lock of the character described comprising a key operated member rotatable in said crown and extending into said stem, a bearing portion on said member, a latch within said stem pivotally carried on said bearing portion, a cam member slidable within said stem, a stud projecting from the end of said key operated member for operating said cam member, a projection on said latch extending into a cam slot in said cam member, a locking projection on said latch adapted to extend through a slot in the wall of said stem for locking said stem against rotational movement relatively to the head, and means in said frame for receiving said locking extension on the latch and retaining the stem against rotational movement.

3. For a bicycle frame having a fixed tubular head with a wheel fork including a crown portion and a hollow stem projecting from the crown portion and rotatable in said head, a lock of the character described comprising a cup-shaped member insertably fitting within said hollow stem and having a bottom portion adapted to close the open end of said stem, a member slidable in said cup-shaped member, a latch having an opening therethrough, a key operated rotatable plug mounted in said crown portion and projecting into said stem through an opening in the wall of said cup-shaped member, a supporting portion adjacent the end of said plug extending through the opening in said latch for pivotally mounting the latch within the stem, means on said plug for moving the slidable member relatively to the latch, co-operating cam means on said latch and slidable member for moving said latch into locked and unlocked positions, a locking projection at the end of said latch adapted to extend through a slot in the wall of the stem, and a plug member fixed to said frame and having a notch therein for receiving the end of said projection to lock the stem against rotation relatively to the frame.

4. For a bicycle frame having a fixed tubular head and a wheel fork with a stem projecting therefrom and rotatably mounted in said head, a lock of the character described comprising a latch pivotally mounted within said stem and adapted to project through a slot in the wall of the stem and engage retaining means in the inner wall of said head for locking the stem against rotation relatively to the head, a longitudinally slidable cam member in said stem between the inner wall thereof and the side of the latch moving said latch into locking and unlocking positions, connecting means between the latch and cam member, a key controlled rotatable plug mounted in said crown and projecting into the stem for operating said member, and spring means within the stem located on the opposite side of the latch from the cam member and adapted to urge said latch against said member and to retain it in either of said locking and unlocking positions.

5. For a bicycle frame having a fixed tubular head and a wheel fork with a crown portion and a stem projecting therefrom and rotatable in said head, a lock comprising a cup-shaped member having a latch, a cam member slidable within said cup-shaped member for operating said latch, and a spring between the wall of said cup-shaped member and the said latch for urging the latch to retain it against said cam shaped member and into locking and unlocking position, the said cup-shaped member being adapted to be inserted into the end of the hollow stem with the said latch, cam member and spring contained therein in relative positions, a key controlled cylinder lock mounted in said crown and projecting into said stem through an opening in the wall of said cup-shaped member and an opening in said latch to swivelly support the latch and retain the cup-shaped member in position to close the opening at the bottom of the stem, means at the end of said plug for operating said cam member, cam means on said latch and member for moving said latch into locking and unlocking positions, and a projection on said latch extending through a slot in said stem and engaging retaining means in the inner wall of the head for preventing rotation of said fork relatively to the frame.

6. A locking mechanism as set forth in claim 5 wherein the said plug has a crank stud projecting from the end thereof and said cam member is slidably positioned between the latch and the wall of the cup-shaped member and has a flat surface thereon engaging said latch, a groove in said flat surface extending crosswise thereto for receiving said stud to transmit rotary movement of the plug into longitudinal movement of the cam member, and an inclined cam slot in said flat surface engaging a pin on said latch for transmitting longitudinal movement of said cam member into rocking movement of said latch.

7. For a device having a hollow rotatable member, a lock comprising a key operated member projecting into said rotatable member, a latch pivotally mounted on said key operated member and within said rotatable member, cam means longitudinally slidable within said rotatable member for operating said latch, means on said key operated member for moving said cam, and a projection on said latch adapted to extend outwardly through a slot in said rotatable member for engagement with a retainer to lock said rotatable member against rotation.

LOUIS M. DYSON.
JOHN G. ROOT.

REFERENCES CITED

The following references are of record in the file of this patent:

UNITED STATES PATENTS

| Number | Name | Date |
| --- | --- | --- |
| 51,059 | Jordan | Nov. 21, 1865 |
| 604,452 | Barr | May 24, 1898 |
| 609,904 | Peters | Aug. 30, 1898 |
| 900,415 | Nelson | Oct. 6, 1908 |
| 2,039,873 | Anderson et al. | May 5, 1936 |
| 2,081,778 | Taman | May 25, 1937 |

FOREIGN PATENTS

| Number | Country | Date |
| --- | --- | --- |
| 380,407 | Italy | May 11, 1940 |